United States Patent
Sridhar et al.

(10) Patent No.: US 11,019,126 B2
(45) Date of Patent: May 25, 2021

(54) QUALITY-OF-EXPERIENCE FOR ADAPTIVE BITRATE STREAMING

(71) Applicant: Nokia Solutions and Networks OY, Espoo (FI)

(72) Inventors: Kamakshi Sridhar, Plano, TX (US); Ahmed A. Tarraf, Bayonne, NJ (US); Jonathan D. Segel, Ottawa (CA); Edward Grinshpun, Freehold, NJ (US); Charles Payette, Oceanport, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 228 days.

(21) Appl. No.: 15/631,245

(22) Filed: Jun. 23, 2017

(65) Prior Publication Data

US 2018/0375915 A1 Dec. 27, 2018

(51) Int. Cl.
*G06F 15/16* (2006.01)
*H04L 29/06* (2006.01)
(Continued)

(52) U.S. Cl.
CPC .......... *H04L 65/80* (2013.01); *H04L 41/5067* (2013.01); *H04L 47/10* (2013.01);
(Continued)

(58) Field of Classification Search
CPC . H04L 47/38; H04L 65/4084; H04L 41/5067; H04L 65/4092; H04L 47/10;
(Continued)

(56) References Cited

U.S. PATENT DOCUMENTS

2009/0017860 A1* 1/2009 Cole ................. H04W 52/0261
455/522
2009/0268684 A1* 10/2009 Lott ..................... H04W 72/087
370/329

(Continued)

OTHER PUBLICATIONS

European Search Report in corresponding EP Application No. 18179392.8, dated Nov. 22, 2018, 9 pages.
(Continued)

*Primary Examiner* — Cheikh T Ndiaye
(74) *Attorney, Agent, or Firm* — Tong, Rea, Bentley & Kim, LLC

(57) ABSTRACT

The present disclosure generally discloses an adaptive bitrate streaming support capability configured to support adaptive bitrate streaming of content. The adaptive bitrate streaming support capability is configured to support adaptive bitrate streaming of content via a wireless access network including an application scheduler and a wireless access device. The application scheduler receives an adaptive bitrate streaming flow and sends the adaptive bitrate streaming flow toward the wireless access device based on scheduling of the adaptive bitrate streaming flow at the application scheduler. The wireless access device determines feedback information associated with the adaptive bitrate streaming flow and provides the feedback information associated with the adaptive bitrate streaming flow to the application scheduler. The application scheduler determines scheduling of the adaptive bitrate streaming flow, for transmission toward the wireless access device, based on the feedback information associated with the adaptive bitrate streaming flow.

20 Claims, 5 Drawing Sheets

(51) Int. Cl.
| | |
|---|---|
| *H04L 12/801* | (2013.01) |
| *H04L 12/859* | (2013.01) |
| *H04W 28/02* | (2009.01) |
| *H04L 12/811* | (2013.01) |
| *H04L 12/24* | (2006.01) |
| *H04N 21/238* | (2011.01) |
| *H04N 21/24* | (2011.01) |

(52) U.S. Cl.
CPC .......... *H04L 47/2475* (2013.01); *H04L 47/38* (2013.01); *H04L 65/4084* (2013.01); *H04L 65/4092* (2013.01); *H04N 21/238* (2013.01); *H04N 21/2402* (2013.01); *H04W 28/0231* (2013.01); *H04L 65/4069* (2013.01); *H04N 21/24* (2013.01)

(58) Field of Classification Search
CPC . H04L 65/80; H04L 47/2475; H04L 65/4069; H04N 21/2402; H04N 21/238; H04N 21/24; H04W 28/0231
See application file for complete search history.

(56) References Cited

U.S. PATENT DOCUMENTS

| | | | | |
|---|---|---|---|---|
| 2012/0117225 | A1* | 5/2012 | Kordasiewicz | H04L 65/1083 709/224 |
| 2012/0179788 | A1* | 7/2012 | McGowan | H04N 21/44222 709/219 |
| 2013/0326551 | A1* | 12/2013 | Chatterjee | H04W 24/10 725/9 |
| 2014/0334309 | A1* | 11/2014 | Mihaly | H04L 47/2441 370/235 |
| 2015/0169696 | A1* | 6/2015 | Krishnappa | G06F 3/04842 707/722 |
| 2016/0381698 | A1 | 12/2016 | Grinshpun et al. | |

OTHER PUBLICATIONS

European Office Action in corresponding EP Application No. 18179392. 8, dated Jan. 30, 2020, 6 pages.

* cited by examiner

QUALITY-OF-EXPERIENCE FOR ADAPTIVE BITRATE STREAMING

TECHNICAL FIELD

The present disclosure relates generally to communication networks and, more particularly but not exclusively, to providing support for adaptive bitrate streaming in wireless communication networks.

BACKGROUND

The use of adaptive bitrate streaming to deliver content items to client devices continues to grow. While the use of adaptive bitrate streaming to deliver content items to client devices generally tends to provide improved quality-of-experience (QoE) for users of the client devices, existing adaptive bitrate streaming techniques may still result in insufficient QoE for users of the client devices under certain conditions.

SUMMARY

The present disclosure generally discloses improvements in support for adaptive bitrate streaming.

In at least some embodiments, an apparatus is provided. The apparatus is configured to support adaptive bitrate streaming. The apparatus includes a processor and a memory communicatively connected to the processor. The processor is configured to receive, by an application scheduler of a wireless access network, an adaptive bitrate streaming flow to be sent via a wireless access device of the wireless access network. The processor is configured to receive, by the application scheduler from the wireless access device, feedback information associated with the adaptive bitrate streaming flow. The processor is configured to determine, by the application scheduler based on the feedback information and reference flow priority information, scheduling of the adaptive bitrate streaming flow at the application scheduler. In at least some embodiments, a non-transitory computer-readable storage medium stores instructions which, when executed by a computer, cause the computer to perform a corresponding method for supporting adaptive bitrate streaming. In at least some embodiments, a corresponding method for supporting adaptive bitrate streaming is provided.

In at least some embodiments, an apparatus is provided. The apparatus is configured to support adaptive bitrate streaming. The apparatus includes a processor and a memory communicatively connected to the processor. The processor is configured to determine, at a wireless access device of a wireless access network based on handling of an adaptive bitrate streaming flow at the wireless access device, feedback information associated with the adaptive bitrate streaming flow. The processor is configured to send the feedback information associated with the adaptive bitrate streaming flow from the wireless access device toward an application scheduler of the wireless access network that is configured to schedule transmission of the adaptive bitrate streaming flow toward the wireless access device. In at least some embodiments, a non-transitory computer-readable storage medium stores instructions which, when executed by a computer, cause the computer to perform a corresponding method for supporting adaptive bitrate streaming. In at least some embodiments, a corresponding method for supporting adaptive bitrate streaming is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
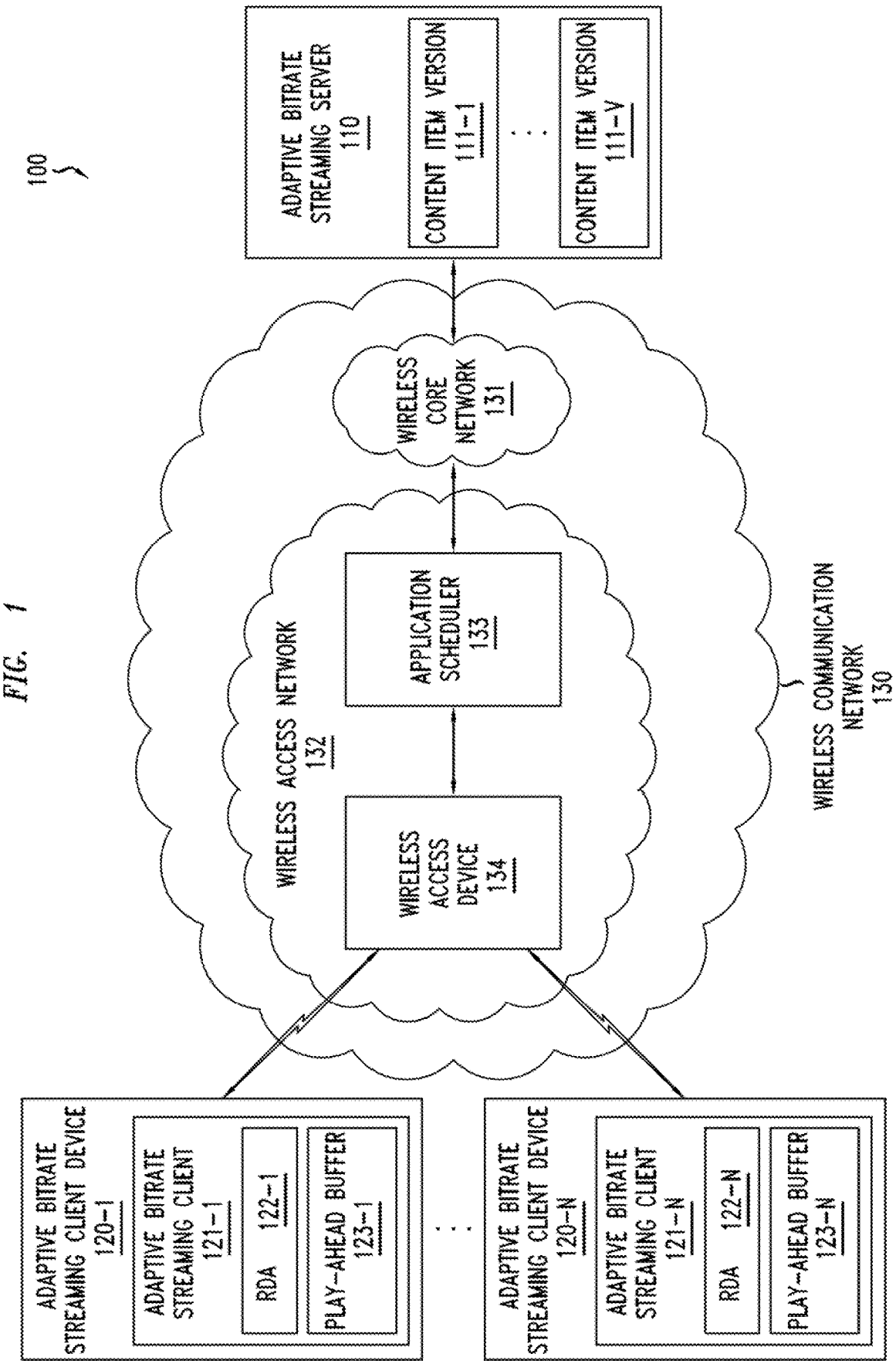
FIG. 1 depicts an example communication system including a wireless communication network configured to support adaptive bitrate streaming of content.

The present disclosure generally discloses improvements in computer performance for supporting adaptive bitrate streaming of content via a wireless communication network. The adaptive bitrate streaming support capability may be configured to improve or optimize the performance of adaptive bitrate streaming flow delivery within a wireless communication network for both the end users and the network operator. The adaptive bitrate streaming support capability may be configured to improve or optimize the performance of adaptive bitrate streaming flow delivery within a wireless access network portion of a wireless communication network without requiring signaling from the wireless access network portion of the wireless communication network to the wireless core network portion of the wireless communication network or to the adaptive bitrate streaming client devices. The adaptive bitrate streaming support capability may be configured to provide improved user quality-of-experience (QoE) for adaptive bitrate streaming flows transported from an adaptive bitrate streaming server to adaptive bitrate streaming client devices via a wireless communication network. The adaptive bitrate streaming support capability may be configured to increase or even maximize the user QoE for adaptive bitrate streaming flows, including best effort adaptive bitrate streaming flows, within a cell of a wireless communication network in a manner that opportunistically considers the channel conditions of individual adaptive bitrate streaming flows within the cell of the wireless communication network and the overall cell congestion of the cell of the wireless communication network. The adaptive bitrate streaming support capability may be configured to increase or even maximize the user QoE for adaptive bitrate streaming flows even in the presence of significant best effort traffic that contributes to overall congestion of the wireless network. The adaptive bitrate streaming support capability may be configured to guarantee or at least support a consistently high bitrate for adaptive bitrate streaming flows over their entire (relatively long) duration that allows the user QoE to be high even in the presence of a significant volume of background traffic, in the presence of varying channel conditions, or the like, as well as various combinations thereof. The adaptive bitrate streaming support capability may be configured to guarantee or at least support a consistent content playout rate to the adaptive bitrate streaming client, without requiring any signaling from the wireless access network to the wireless core network or to the adaptive bitrate streaming client, thereby ensuring that client buffers of the adaptive bitrate streaming client will never be empty (no buffer underruns) and that the adaptive bitrate streaming client will request only gradual changes in bitrate level from the network such that a visibly smooth user QoE may be obtained. The adaptive bitrate streaming support capability may be configured to provide improved user QoE for various types of adaptive bitrate streaming technologies (e.g., Hypertext Transfer Protocol (HTTP) Adaptive Streaming (HAS), Dynamic Adaptive Streaming over HTTP (DASH), APPLE HTTP Live Streaming, MICROSOFT SMOOTHSTREAMING, ADOBE FLASH, or the like), for various types of end devices (e.g., end user devices, machine-type-communication (MTC) devices, Internet-of-Things (IoT) devices), or the like), or the like, as well as various combinations thereof. The adaptive bitrate streaming support capability may be configured to provide improved user QoE for adaptive bitrate streaming flows for various types of adaptive bitrate streaming flows (e.g., network operator sourced flows, over-the-top (OTT) flows, or the like, as well as various combinations thereof). It will be appreciated that these and various other embodiments and advantages and potential advantages of the adaptive bitrate streaming capability may be further understood by way of reference to the example communication system of FIG. 1.

FIG. 1 depicts an example communication system including a wireless communication network configured to support adaptive bitrate streaming of content The communication system 100 includes an adaptive bitrate streaming server 110, a set of adaptive bitrate streaming client devices 120-1-120-N (collectively, adaptive bitrate streaming client devices 120), and a wireless communication network 130.

The adaptive bitrate streaming server 110 stores a content item as a set of content item versions 111-1-111-V (collectively, content item versions 111) available for use in delivering the content item to ones of the adaptive bitrate streaming client devices 120 using adaptive bitrate streaming, where V may be equal to or greater than one. The content item versions 111-1-111-V are different versions of the content item that have been encoded at V different resolutions/bitrates (and, therefore, represent V different quality levels of the content item). The content item versions 111 are each segmented into time-synchronized segments or chunks having mean play duration time (e.g., each of which is typically between two and ten seconds, although shorter or longer chunk lengths may be supported). It will be appreciated that (1) higher resolution/bitrate yields sharper and higher quality picture with higher video QoE, but requires more network bandwidth to deliver the chunks, whereas (2) lower resolution/bitrate requires less network throughput to deliver the segments but may lead to blocky and/or blurry picture and overall lower QoE. The content item versions 111 of the content item may be provided to the adaptive bitrate streaming server 110 (e.g., generated by the content source of the content item or generated by an encoding device disposed between the content source of the content item and the adaptive bitrate streaming server 110), generated by the adaptive bitrate streaming server 110, or the like, as well as various combinations thereof. The content item 111 may be a video content item, a multimedia content item (e.g., a combination of video and audio), a virtual reality content item, an augmented reality content item, or any other suitable form of content item which may be streamed using adaptive bitrate streaming). It will be appreciated that the adaptive bitrate streaming server 110 may be a central content server (e.g., the server storing the original content item on which the content item versions 111 are based), a local content server (e.g., a server storing some or all of the content item versions 111 based on local requests for content item versions 111 of the content item, such as a Content Delivery Network (CDN) server or other suitable type of server), a local content cache (e.g., a cache that caches some or all of the content item versions 111 based on previous sessions, such as a CDN cache or other suitable type of cache), or the like. It will be appreciated that, although omitted from FIG. 1 for purposes of clarity, adaptive bitrate streaming server 110 may be configured to store multiple sets of content items versions for multiple content items, respectively.

The adaptive bitrate streaming client devices 120 are configured to request and receive (and, optionally, display) the content item available from the adaptive bitrate streaming server 110. The adaptive bitrate streaming client devices 120 are configured to request and receive the content item available from the adaptive bitrate streaming server 110 based on adaptive bitrate streaming. The adaptive bitrate streaming client devices 120-1-120-N include adaptive bitrate streaming clients 121-1-121-N (collectively, adaptive bitrate streaming clients 121), respectively, which are configured to request and receive the content item from the adaptive bitrate streaming server 110 using adaptive bitrate streaming technology. The adaptive bitrate streaming clients 121 may request and receive the content item from the adaptive bitrate streaming server 110 based on content item version availability information (e.g., a HAS manifest file or other similar type of content item version availability information which may be provided in other forms for other types of adaptive bitrate streaming) that is provided to the adaptive bitrate streaming clients 121 (e.g., information providing identification of content item versions 111 available from adaptive bitrate streaming server 110 and, optionally, from other servers or caches, which may include URLs of the devices from which content item versions 111 are available and indications of ones of the content item versions 111 available from the respective devices). The adaptive bitrate streaming clients 121-1-121-N may include rate determination algorithms (RDAs) 122-1-122-N (collectively, RDAs 122), respectively, which are configured to determine, for each chunk of a content item being streamed, the particular one of the different content item versions $111_i$ from which the chunk of the content item is to be requested. The adaptive bitrate streaming client devices 120-1-120-N also may include play-ahead buffers 123-1-123-N, respectively, which are configured to buffer received chunks of the content item to achieve smoother QoE during playout of the content item. The adaptive bitrate streaming client devices 120 may include any types of end devices (which, in the case of FIG. 1, are wireless end devices configured to communicate via wireless communication network 130) configured to request and receive the content item available from the adaptive bitrate streaming server 110 based on adaptive bitrate streaming. For example, the adaptive bitrate streaming client devices 120 may include wireless end user devices (e.g., smartphones, tablets, laptops, or the like), wireless MTC devices, wireless IoT devices, or the like.

The adaptive bitrate streaming server 110 and an adaptive bitrate streaming client device 120 are configured to support adaptive bitrate streaming of the content item from the adaptive bitrate streaming server 110 to the adaptive bitrate streaming client device 120. The adaptive bitrate streaming client 121 of adaptive bitrate streaming client device 120 is configured to request chunks of the content item from the adaptive bitrate streaming server 110 where, for each chunk of the content item, the adaptive bitrate streaming client 121 may request delivery of the chunk from any of the V different content item versions $111_i$ available from the adaptive bitrate streaming server 110. The RDA 122 of the adaptive bitrate streaming client 121 is configured to determine, for each chunk of the content item, the particular one of the different content item versions $111_i$ from which the chunk of the content item is to be requested. The RDA 122 may determine, for a given chunk of the content item to be requested next, which one of the V different content item versions $111_i$ from which the chunk of the content item is to be requested based on a highest bitrate expected to be sustainable by the delivery network without impacting end user QoE experienced by a user of the adaptive bitrate streaming client device 120. The RDA 122 may determine, for a given chunk of the content item to be requested next, which one of the V different content item versions $111_i$ from which the chunk of the content item is to be requested based on the fullness of its play-ahead buffer 123 (e.g., an indication of a percentage of the capacity of the play-ahead buffer 123 that is being used for storage of chunks) and historic estimates of the network throughput. The RDA 122 may dynamically select higher or lower quality content item versions $111_i$ from which to request chunks of the content item. In other words, the RDA 122 may continually sense the available throughput and adapt the bitrate accordingly (e.g., selecting different content item versions $111_i$ based on available throughput). The typical manner in which the RDA 122 determines which one of the V different content item versions $111_i$ from which a next chunk of the content item is to be requested (e.g., based on a measure of the bandwidth available to the adaptive bitrate streaming client device 120, based on whether or not chunks are consistently delivered in a time shorter than the interval length, based on an average of time taken by the adaptive bitrate streaming client device 120 to download previous chunks of the content item, or the like, as well as various combinations thereof) will be understood by one skilled in the art. The adaptive bitrate streaming client 121 may request the chunks of the content item by sending requests for chunks of the content item versions $111_i$ as determined by the RDA 122 of adaptive bitrate streaming client 121. The adaptive bitrate streaming server 110 receives the chunk requests, for chunks of the content item with the particular content item version $121_i$ being specified for each requested chunk, from adaptive bitrate streaming client device 120 and provides the requested chunks of the content item to adaptive bitrate streaming client device 120 from the content item versions $111_i$ of the content item. The adaptive bitrate streaming client device 120 receives the requested chunks of the content item from the adaptive bitrate streaming server 110 and buffers the received chunks of the content item in the play-ahead buffer 123 for playout (e.g., via a presentation interface of the adaptive bitrate streaming client device 120 or other presentation device which may be communicatively connected to the adaptive bitrate streaming client device 120). The adaptive bitrate streaming supported by adaptive bitrate streaming server 110 and the adaptive bitrate streaming client device 120 may be based on any suitable adaptive bitrate streaming technology implementation (e.g., HAS, DASH, LiveStreaming, SMOOTHSTREAMING, FLASH, or the like). It will be appreciated that, although primarily presented with respect to embodiments in which the chunks of the content item are requested from a single source (namely, the adaptive bitrate streaming server 110), chunks of the content item are requested from multiple sources (e.g., different CDN servers, different CDN caches, or the like, as well as various combinations thereof).

The wireless communication network 130 is configured to support transport of adaptive bitrate streaming flows from adaptive bitrate streaming server 110 to adaptive bitrate streaming client devices 120. The wireless communication network 130 includes a wireless core network 131 and a wireless access network 132. The wireless communication network 130 may be any suitable type of wireless communication network which may support transport of adaptive bitrate streaming flows from adaptive bitrate streaming server 110 to adaptive bitrate streaming client devices 120. For example, the wireless communication network 130 may be a Third Generation (3G) wireless network (e.g., a Universal Mobile Telecommunications System (UMTS) network, a Code Division Multiple Access 200 (CDMA-2000) network, or the like), a Fourth Generation (4G) wireless network (e.g., a Long Term Evolution (LTE) network, an LTE-Advanced network, or the like), a Fifth Generation (5G) wireless network, or the like, as well as various combinations thereof.

The wireless core network 131 of the wireless communication network 130 may include various elements (omitted from FIG. 1 for purposes of clarity) which may support transport of adaptive bitrate streaming flows from the adaptive bitrate streaming server 110 to the adaptive bitrate streaming client device 120. It will be appreciated that the type of elements included within the core network 131 may depend on the wireless technology of the wireless communication network 130. For example, in the case of a 3G wireless communication network, the wireless core network 131 may include serving general packet radio service (GPRS) support nodes (SGSNs), gateway GPRS support nodes (GGSNs), mobile switching centers (MSCs), or the like, as well as various combinations thereof. For example, in the case of a 4G wireless communication network, the wireless core network 131 may include serving gateways (SGWs), packet data network (PDN) gateways (PGWs), mobility management entities (MMEs), or the like, as well as various combinations thereof. It will be appreciated that the wireless core network 131 of the wireless communication network 130 may include various other types of elements.

The wireless access network 132 of the wireless communication network 130 includes an application scheduler (AS) 133 and a wireless access device (WAD) 134.

The AS 133 is configured to provide network quality-of-service (QoS) functions within the wireless access network 132. The AS 133 is configured to provide network QoS functions for adaptive bitrate streaming flows being transported via the wireless communication network 130. The AS 133 may be configured to support various functions of the adaptive bitrate streaming capability. The AS 133 may be configured to support improved adaptive bitrate streaming for adaptive bitrate streaming flows being transported via the wireless communication network 130 based on feedback information received from the WAD 134. The operation of AS 133 in supporting improved adaptive bitrate streaming for adaptive bitrate streaming flows may be further understood by way of reference to FIG. 2.

The WAD 134 is configured to operate as a wireless point of access for the adaptive bitrate streaming client devices 120, supporting control messaging from the adaptive bitrate streaming client devices 120 and over-the-air delivery of adaptive bitrate streaming flows from the adaptive bitrate streaming server 110 to the adaptive bitrate streaming client devices 120. The access device type of the WAD 134 may depend on the wireless network type of the wireless communication network 130. For example, WAD 134 may be a base station (BS), a NodeB, an evolved NodeB (eNodeB), a 5G access device, a small cell device (e.g., a metro cell device, a pico cell device, a femto cell device, or the like), or the like.

The WAD 134 is configured to provide adaptive bitrate streaming optimization functions within the wireless access network 132. The WAD 134 is configured to provide adaptive bitrate streaming optimization functions for adaptive bitrate streaming flows being transported via the wireless communication network 130. The WAD 134 may be configured to support various functions of the adaptive bitrate streaming capability. The WAD 134 may be configured to support improved adaptive bitrate streaming for adaptive bitrate streaming flows being transported via the wireless communication network 130 based on feedback information determined at the WAD 134 based on analytics. The operation of WAD 134 in supporting improved adaptive bitrate streaming for adaptive bitrate streaming flows may be further understood by way of reference to FIG. 2.

It will be appreciated that wireless communication network 130 may include various other devices and functions (which are omitted from FIG. 1 for purposes of clarity), including various other devices and functions for the wireless core network 131 of the wireless communication network 130, various other devices and functions for the wireless access network 132 of the wireless communication network 130, and so forth.

Figure 2:
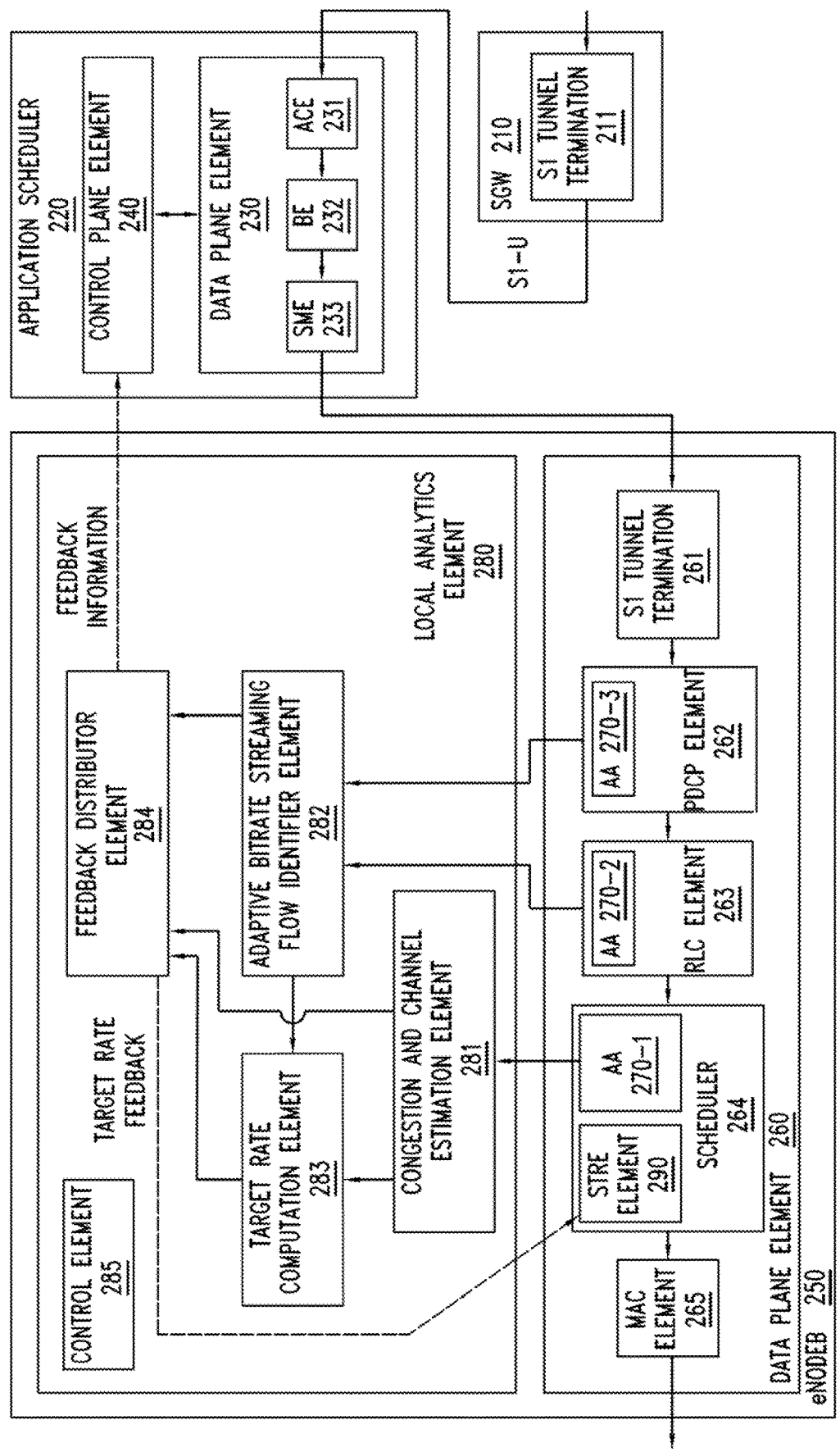
FIG. 2 depicts a portion of a wireless communication network for illustrating operation of elements configured to support improved adaptive bitrate streaming for adaptive bitrate streaming flows transported via the wireless communication network.

FIG. 2 depicts a portion of a wireless communication network for illustrating operation of elements configured to support improved adaptive bitrate streaming for adaptive bitrate streaming flows transported via the wireless communication network.

The wireless communication network 200 of FIG. 2 may correspond to a specific implementation of the wireless communication network 130 of FIG. 1 in which the wireless communication network 130 is a 4G Long Term Evolution (LTE) wireless communication network. It will be appreciated that various embodiments presented herein with respect to the wireless communication network 200 of FIG. 2 may be provided within the context of various other types of wireless communication networks (e.g., such as one or more of those discussed with respect to the wireless communication network 130 of FIG. 1).

The wireless communication network 200 of FIG. 2 includes an SGW 210, an application scheduler (AS) 220, and an evolved node B (eNB) 250. The SGW 210 may correspond to an element of the wireless core network 131 of FIG. 1, the AS 220 may correspond to the AS 133 of FIG. 1, and the eNB 250 may correspond to the WAD 134 of FIG. 1. It is noted that the adaptive bitrate streaming server 110 and the adaptive bitrate streaming client devices 120 are omitted from FIG. 2 for purposes of clarity, but it is assumed that one or more adaptive bitrate streaming flows between the adaptive bitrate streaming server 110 and one or more adaptive bitrate streaming client devices 120 are being transported via the wireless communication network 200 of FIG. 2.

The SGW 210 is configured to support transport of adaptive bitrate streaming flows from the adaptive bitrate streaming server 110 and adaptive bitrate streaming client devices 120 via the wireless communication network 200. The SGW 210 includes an S1 tunnel termination 211. It will be appreciated that SGW 210 may be configured to provide various other functions, may include various other elements, or the like, as well as various combinations thereof.

The AS 220 is configured to support transport of adaptive bitrate streaming flows from the adaptive bitrate streaming server 110 and adaptive bitrate streaming client devices 120 via the wireless communication network 200. The AS 220 is configured to support various application scheduling functions for supporting transport of adaptive bitrate streaming flows within the wireless communication network 200. The AS 220 is configured to support various network-based QoS functions for controlling QoS of adaptive bitrate streaming flows within the wireless communication network 200. The AS 220 includes a data plane element 230, configured to support transport of adaptive bitrate streaming flows within the wireless communication network 200, which includes an application classification element (ACE) 231, a buffering element (BE) 232, and a scheduler marking element (SME) 233. The AS 220 includes a control plane element 240 that is configured to support control over the data plane element 230 that supports transport of adaptive bitrate streaming flows via the AS 220 and, thus, to support control over transport of adaptive bitrate streaming flows within the wireless communication network 200. It will be appreciated that AS 220 may be configured to provide various other functions, may include various other elements, or the like, as well as various combinations thereof.

The eNB 250 is configured to support transport of adaptive bitrate streaming flows from the adaptive bitrate streaming server 110 to adaptive bitrate streaming client devices 120 via the wireless communication network 200. The eNB 250 is configured to support various scheduling functions for supporting transport of adaptive bitrate streaming flows within the wireless communication network 200. The eNB 250 is configured to support various adaptive bitrate streaming optimization functions for improving or even optimizing transport of adaptive bitrate streaming flows via the wireless communication network 200.

The eNB 250 includes a data plane element 260, configured to support transport of adaptive bitrate streaming flows within the wireless communication network 200. The data plane element 260 includes an S1 tunnel termination 261, a packet data convergence protocol (PDCP) element 262, a radio link control (RLC) element 263, a scheduler 264, and a media access control (MAC) element 265. It will be appreciated that data plane element 260 of eNB 250 may be configured to provide various other functions, may include various other elements, or the like, as well as various combinations thereof.

The eNB 250 includes various control plane elements that are configured to support control over transport of adaptive bitrate streaming flows within the wireless communication network 200. The control plane elements may include a set of analytics agents (AAs) 270, a local analytics element (LAE) 280, and a scheduler target rate enforcement (STRE) element 290. The AAs 270 may include an AA 270-1 that is associated with the scheduler 264, an AA 270-2 that is associated with the RLC element 263, and an AA 270-3 that is associate with the PDCP element 262. The LAE 280 includes a congestion and channel estimation element (CCEE) 281, an adaptive bitrate streaming flow identifier element (ABSFIE) 282, a target rate computation element (TRCE) 283, a feedback distributor element (FDE) 284, and a control element (CE) 285. It will be appreciated that the various control plane elements of eNB 250 may include various other control elements, may be configured to provide various other functions, or the like, as well as various combinations thereof.

The wireless communication network 200 supports delivery of adaptive bitrate streaming flows via a data plane path that includes the SGW 210, the AS 220, and the eNB 250. The data plane path includes the S1 tunnel termination 211 of SGW 210, the data plane element 230 of AS 220 (including ACE 231, BE 232, and SME 233), and the data plane element 260 of eNB 250 (including S1 tunnel termination 261, PDCP element 262, RLC element 263, scheduler 264, and MAC element 265. The adaptive bitrate streaming flows traverse an S1 tunnel between the SGW 210 and the eNB 250 that traverses the AS 220. The S1 tunnel is established between an S1 tunnel termination 211 of SGW 210 and the S1 tunnel termination 261 of eNB 250. The eNB 250 supports over-the-air delivery of adaptive bitrate streaming flows to adaptive bitrate streaming client devices.

The wireless communication network 200 supports improved control over delivery of adaptive bitrate streaming flows via the wireless communication network 200.

The eNB 250 is configured to support determination of feedback information which may be used for improved control over delivery of adaptive bitrate streaming flows via the wireless communication network 200. The AAs 270 of eNB 250 are configured to generate reports associated with the eNB wireless resource allocation and wireless bearer characteristics of data flows (including the adaptive bitrate streaming flows) traversing the data plane element 260 of eNB 250 and provide the reports associated with the eNB wireless resource allocation and wireless bearer characteristics of data flows (again, including the adaptive bitrate streaming flows) traversing the data plane element 260 of eNB 250 to the LAE 280 of eNB 250. The LAE 280 of eNB 250 is configured to receive the reports associated with the eNB wireless resource allocation and wireless bearer characteristics of data flows (including the adaptive bitrate streaming flows) traversing the data plane element 260 of eNB 250 from the AAs 270 of eNB 250 and to generate feedback information based on the reports associated with the eNB wireless resource allocation and wireless bearer characteristics of data flows (again, including the adaptive bitrate streaming flows) traversing the data plane element 260 of eNB 250. The LAE 280 of eNB 250 is configured to provide the feedback information to the STRE element 290 of eNB 250 for use by the STRE element 290 of eNB 250 to perform adaptive bitrate streaming optimization functions for improved control over delivery of adaptive bitrate streaming flows via the wireless communication network 200. The LAE 280 of eNB 250 is configured to provide the feedback information to the AS 220 for use by the AS 220 to perform network-based QoS functions for improved control over delivery of adaptive bitrate streaming flows via the wireless communication network 200.

The AAs 270 of eNB 250 are configured to generate reports associated with the eNB wireless resource allocation and wireless bearer characteristics of data flows traversing the data plane element 260 of eNB 250 and provide the reports associated with the eNB wireless resource allocation and wireless bearer characteristics of data flows to the LAE 280 of eNB 250. The reports may be provided in the form of data digest messages. The providing of the reports (e.g., the content that is included within the reports, the destinations of the reports, or the like, as well as various combinations thereof) may vary for the different elements of the data plane element 260 of eNB 250.

The AA 270-1 that is associated with the scheduler 264 is configured to generate reports associated with serving eNB cell/sector congestion levels and individual bearer channel conditions using scheduler 264 data for wireless bearer data flows and to provide the reports to the CCEE 281 of the LAE 280. The reports provided by the AA 270-1 may include a short term average congestion metric for the reporting period computed for each eNB cell/sector per QoS Class Identifier (QCI) and direction (uplink and downlink) as average available physical resource block (PRB) rates per second for an idealistic 'very active' bearer that almost always has data to transmit. The reports provided by the AA 270-1 may include data to compute channel conditions for each wireless bearer in the form of wireless PRB distribution per Modulation and Coding Schema (MCS) as assigned by the scheduler for a reporting period. It is noted that the reporting period may be configured to be N seconds (e.g., N=1, N=3, or the like). The reports provided by the AA 270-1 may include a globally unique eNB cell/sector identifier which enables LAE 280 to determine which bearers are served by a specific cell/sector. The reports provided by the AA 270-1 may include globally unique bearer identifiers for bearer-specific information which enable the LAE 280 to distinguish between the bearers. The reports provided by the AA 270-1 may include various other types of metrics, data, or the like, as well as various combinations thereof.

The AA 270-2 that is associated with the RLC element 263 is configured to generate, per wireless bearer, reports associated with the RLC buffering of wireless bearer data for the flows traversing the RLC element 263 and to provide the reports to the ABSFIE 282 of the LAE 280. The reports provided by the AA 270-2 may include, per wireless bearer, a sequence of average RLC buffer size over fine granularity bin periods (e.g., bin periods may be configured to be 5 milliseconds, 10 milliseconds, 50 milliseconds, or any other suitable length of time). The reports provided by the AA 270-2 may include globally unique bearer identifiers for bearer-specific information which enable the LAE 280 to distinguish between the bearers. The reports provided by the AA 270-2 may include various other types of metrics, data, or the like, as well as various combinations thereof.

The AA 270-3 that is associated with the PDCP element 262 is configured to generate reports associated with the time distribution of wireless bearer data for flows traversing the PDCP element 262 and to provide the reports to the ABSFIE 282 of the LAE 280. The reports provided by the AA 270-3 may include, per wireless bearer flow, the number of data bytes arriving at the PDCP element 262 over a sequence of fine granularity bin periods (e.g., bin periods may be configured to be, 5 milliseconds, 10 milliseconds, 50 milliseconds, or any other suitable length of time). The reports provided by the AA 270-3 may include globally unique bearer identifiers for bearer-specific information which enable the LAE 280 to distinguish between the bearers. The reports provided by the AA 270-3 may include various other types of metrics, data, or the like, as well as various combinations thereof.

It will be appreciated that the AAs 270 of eNB 250 may include fewer or more AAs 270, may generate reports including other types of information, may provide reports to other elements of LAE 280, or the like, as well as various combinations thereof.

The LAE 280 of eNB 250 is configured to receive the reports associated with the eNB wireless resource allocation and wireless bearer characteristics of data flows traversing the data plane element 260 of eNB 250 from the AAs 270 of eNB 250 and to generate, based on the reports, feedback information. The feedback information is associated with wireless bearers supporting the adaptive bitrate streaming flows (and, optionally, one or more other types of data flows supported by eNB 250 or even all flows supported by eNB 250) and, thus, also may be considered to be associated with the adaptive bitrate streaming flows.

The CCEE 281 of the LAE 280 is configured to receive reports associated with serving eNB cell/sector congestion levels and individual bearer channel conditions for wireless bearer data flows from AA 270-1 associated with the scheduler 264 of eNB 250. The CCEE 281 is configured to determine, based on the reports associated with the adaptive bitrate streaming flows, cell congestion information indicative of a level of congestion of the cell/sector of eNB 250 that is serving different bearers including those that carry the adaptive bitrate streaming flows, channel condition information indicative of bearer channel conditions for each of the individual wireless bearers, or the like, as well as various combinations thereof. The CCEE 281 is configured to provide eNB cell/sector congestion level and individual bearer channel conditions for all wireless bearers to the ABSFIE 282, to the TRCE 283, and to the FDE 284. The eNB cell/sector congestion level may be provided in the form of average available PRB rate for a 'very active' bearer. The bearer channel conditions may be provided in the form of average number of useful (without retransmission) bits per PRB assigned by the scheduler 264 of eNB 250.

The ABSFIE 282 of the LAE 280 is configured to receive the reports associated with the RLC buffering of wireless bearer data for the flows traversing the RLC element 263 from the AA 270-2 associated with the RLC element 263 of eNB 250 and, optionally, the reports associated with the time distribution of wireless bearer data for flows traversing the PDCP element 262 from the AA 270-3 associated with the PDCP element 262 of the eNB 250. The ABSFIE 282 of the LAE 280 also is configured to receive reports on cell/sector congestion levels and individual bearer channel conditions from the CCEE 281 of the LAE 280. The ABSFIE 282 is configured to determine, based on the data provided in the reports from CCEE 281, AA 270-2, and AA 270-3, which bearers carry adaptive bitrate streaming flows. The ABSFIE 282 is configured to provide the bearer identifiers for the bearers that are determined to carry adaptive bitrate streaming flows to the TRCE 283 and to the FDE 284.

The TRCE 283 is configured to receive the cell/sector congestion data and the wireless bearer channel condition data from the CCEE 281 and the identifiers for the bearers that carry adaptive bitrate streaming flows from the ABSFIE 282. The TRCE 283 is configured to determine, based on the congestion level of the cell/sector, the channel conditions of individual bearers served by that cell/sector received from CCEE 281, and the identities of the bearers carrying adaptive bitrate streaming flows received from the ABSFIE 282, a set of jointly optimized target throughput rates for the bearers carrying adaptive bitrate streaming flows that are served by that cell/sector.

The FDE 284 is configured to receive the cell/sector congestion data and the wireless bearer channel condition data from the CCEE 281, the identifiers of the bearers that carry adaptive bitrate streaming flows from the ABSFIE 282, and the computed target rates for the bearers that carry adaptive bitrate streaming flows from the TRCE 283. The FDE 284 is configured to determine feedback information. The feedback information may include globally unique cell/sector identifiers with the respective cell/sectors congestion levels (e.g., received from CCEE 281), the globally unique bearer identifiers together with per wireless bearer channel conditions and serving cell/sector identifier (e.g., received from CCEE 281), the globally unique bearer identifiers for the wireless bearers carrying adaptive bitrate streaming flows (e.g., received from ABSFIE 282), the globally unique bearer identifiers together with the target rate information for the bearers carrying adaptive bitrate streaming flows, the flow identifiers of the adaptive bitrate streaming flows together with target rate information for the adaptive bitrate streaming flows, or the like, as well as various combinations thereof. The FDE 284 is configured to distribute various portions of the feedback information in various ways to support improved control over delivery of adaptive bitrate streaming flows via the wireless communication network 200 (e.g., to the STRE element 290 of eNB 250 for use by the STRE element 290 of eNB 250 to perform adaptive bitrate streaming optimization functions for improved control over delivery of adaptive bitrate streaming flows via the wireless communication network 200, to the AS 220 for use by the AS 220 to perform network-based QoS functions for improved control over delivery of adaptive bitrate streaming flows via the wireless communication network 200, or the like, as well as various combinations thereof).

The FDE 284 is configured to determine feedback information for the STRE element 290 of eNB 250 and provide the feedback information to the STRE element 290 of eNB 250 for use by the STRE element 290 of eNB 250 to perform adaptive bitrate streaming optimization functions for improved control over delivery of adaptive bitrate streaming flows via wireless communication network 200. The feedback information determined by FDE 284 and provided by FDE 284 to the STRE element 290 of eNB 250 may include target rate information for wireless bearers transporting adaptive bitrate streaming flows. The target rate for a given wireless bearer may be a desired throughput rate over the wireless network as allocated by the scheduler 264 of eNB 250 for the packets carried by the given wireless bearer. The target rate information may be provided for individual bearers (e.g., for each of one or more bearers, the target rate information includes a bearer identifier of the bearer, a bearer type of the bearer, and the target rate computed by the TRCE 283 for the bearer), for bearer types (e.g., for each of one or more bearer types, the target rate information include a bearer type identifier (e.g., ALL_BEARERS or something similar to indicate that the target rate is for all bearers of the specified bearer type), the bearer type for which the target rate is being provided, and the target rate for the bearer type), or the like, as well as various combinations thereof. The bearer type of a wireless bearer may correspond to the application flow type carried by the wireless bearer (e.g., bearers carrying adaptive bitrate streaming flows may be one type, bearers carrying web browsing traffic may be one type, bearers carrying FTP download flows may be one type, or the like). For example, the target rate information may be specified as [BEARER ID, BEARER TYPE, TARGET RATE], where the BEARER ID may be the bearer identifier of an individual bearer where the target rate is for that individual bearer or ALL_BEARERS (or something similar) where the target rate is for all bearers of a bearer type. It will be appreciated that other types of information may be included in the feedback information, the feedback information may be specified in other ways, or the like, as well as various combinations thereof.

The STRE 290 is configured to receive the feedback information from the FDE 284 and to perform adaptive bitrate streaming optimization functions based on the feedback information (e.g., for improved control over delivery of adaptive bitrate streaming flows via wireless communication network 200). For example, the STRE 290 may be configured to set the scheduler target rate of the scheduler 264 of eNB 250 in accordance with the target rate received in the feedback information from the FDE 284.

The FDE 284 is configured to determine feedback information for the AS 220 and provide the feedback information to the AS 220 for use by the AS 220 to perform network-based QoS functions for improved control over delivery of adaptive bitrate streaming flows via the wireless communication network 200.

The feedback information determined by the FDE 284 and provided to the AS 220 may include cell-level congestion information and flow-level information that includes channel condition information of wireless bearers supporting adaptive bitrate streaming flows.

The cell-level congestion information may include a cell identifier and the cell congestion level of the cell. The cell congestion level of the cell may be specified at various levels of granularity, such as using three congestion levels (e.g., low, medium, and high), using six congestion levels (e.g., none, very low, low, medium, high, and very high), or the like.

The channel condition information may include, for each of one or more adaptive bitrate streaming flows transported over one or more wireless bearers, a respective flow identifier of the respective adaptive bitrate streaming flow and a respective channel condition (or level) of the wireless bearer that is supporting the respective adaptive bitrate streaming flow. The adaptive bitrate streaming flows may be defined and, thus, identified, in various ways (e.g., an adaptive bitrate streaming flow may refer to a collection of data packets belonging to an Internet Protocol (IP) flow and identified by TCP/IP header fields, a collection of data packets carried by a specific wireless bearer and identified by wireless bearer identifier, a collection of data packets carried by a GPRS Tunneling Protocol (GTP) tunnel and identified by GTP Tunnel Endpoint (TE) identified carried in the GTP header, or the like). The channel conditions of the wireless bearers supporting the adaptive bitrate streaming flows may be specified at various levels of granularity, such as using three channel condition levels (e.g., poor, fair, good), using five channel condition levels (e.g., very poor, poor, fair, good, and excellent), or the like.

The feedback information including the include cell-level congestion information and flow-level information may be specified in various ways. For example, the feedback information including the include cell-level congestion information and flow-level information may be specified as follows: [cell_id, congestion_level, [[FlowID_1, channel level_1], [FlowID_2, channel_level_2], . . . ]]. It will be appreciated that the feedback information may be specified in other ways.

The feedback information including the cell-level congestion information and flow-level information may be sent using various timescales. The feedback information may be sent such that the cell-level congestion information and the flow-level information are sent using the same or similar time scales (e.g., together at the same time or contemporaneously, separately at the same time or contemporaneously), or the like. The feedback information may be sent such that the cell-level congestion information and the flow-level information are sent using different timescales (e.g., the cell-level congestion information is sent less frequently than the flow-level information). For example, the feedback information could be split as follows: (1) [cell_id, congestion level] reported over longer time durations and (2) [[flowID_1, channel level_1], [flowID_2, channel level_2] . . . ] reported over shorter time durations.

The feedback information determined by the FDE 284 and provided to the AS 220 may include cell-level congestion information and flow-level information that includes channel condition information of wireless bearers supporting adaptive bitrate streaming flows and target rate information indicative of target rates for the adaptive bitrate streaming flows (namely, this adds target rate information to the feedback information discussed above).

The cell-level congestion information and the channel condition information may be the same as discussed above when target rate information is not provided as part of the feedback information.

The target rate information may include, for each of one or more adaptive bitrate streaming flows supported by one or more wireless bearers, a respective flow identifier of the respective adaptive bitrate streaming flow and a respective target rate of the respective adaptive bitrate streaming flow. The target rate of a given adaptive bitrate streaming flow may be a target throughput rate for the given adaptive bitrate streaming flow. The target rates of the adaptive bitrate streaming flows may be specified at various levels of granularity, such as using three target rate levels (e.g., low, medium, and high), using five target rate levels (e.g., very low, low, medium, high, and very high), or the like. The target rate information indicative of target rates for the adaptive bitrate streaming flows may be determined by the FDE 284 based on the target rate information provided from the FDE 284 to the STRE element 290 of eNB 250 for use by the STRE element 290 of eNB 250 to perform adaptive bitrate streaming optimization functions for improved control over delivery of adaptive bitrate streaming flows via wireless communication network 200.

The feedback information including cell-level congestion information and flow-level information may be specified in various ways. For example, the feedback information including cell-level congestion information and flow-level information may be specified as follows: [cell_id, congestion_level, [[FlowID_1, channel level_1, target_rate_1], [FlowID_2, channel_level_2, target_rate_2], . . . ]]. It will be appreciated that the feedback information may be specified in other ways.

The feedback information including cell-level congestion information and flow-level information may be sent using various timescales. The feedback information may be sent such that the cell-level congestion information and the flow-level information are sent using the same or similar time scales (e.g., together at the same time or contemporaneously, separately at the same time or contemporaneously, or the like). The feedback information may be sent such that the cell-level congestion information and the flow-level information are sent using different timescales (e.g., the cell-level congestion information is sent less frequently than the flow-level information). For example, the feedback information could be split as follows: (1) [cell_id, congestion level] reported over longer time durations and (2) [[flowID_1, channel level_1, target_rate_1], [flowID_2, channel level_2, target_rate_2] . . . ] reported over shorter time durations.

The AS 220 receives the feedback information from the FDE 284 of eNB 250 and determines the priority levels of the adaptive bitrate streaming flows based on the feedback information from the FDE 284 of eNB 250. The AS 220 may be configured to set the priority levels of the adaptive bitrate streaming flows, based on the feedback information, in a manner tending to prioritize the adaptive bitrate streaming flows over other types of flows traversing the AS 220 (e.g., flows other than adaptive bitrate streaming flows). It is noted that, as discussed further below, the manner in which the AS 220 determines and sets the priority levels of the adaptive bitrate streaming flows based on the feedback information may depend on the type of information included in the feedback information. The AS 220 may be configured to keep the priority levels of the other types of flows constant or even to reduce priority levels of other types of flows to reduce congestion on radio links of the eNB 250. In this manner, the AS 220 is configured to determine and set the priority levels of the adaptive bitrate streaming flows relative to the other types of flows such that the adaptive bitrate streaming flows receive improved or even optimized QoE.

The AS 220, when the feedback information includes cell-level congestion information and flow-level information including channel condition information, may be configured to determine the priority of an adaptive bitrate streaming flow based on a combination of the cell-level congestion information of the cell with which the adaptive bitrate streaming flow is associated and the channel condition information of the wireless bearer supporting the adaptive bitrate streaming flow. In at least some embodiments, for example, the AS 220 may have access to flow priority reference information configured to define priority levels for combinations of cell congestion levels and channel condition levels. An example in which flow priority reference information, configured to define priority levels for combinations of cell congestion levels and channel condition levels, is maintained as a matrix is presented in Table 1 below; however, it will be appreciated that the flow priority reference information may be maintained in various other ways (e.g., using various other types of data structures, various other organizations of the information, or the like, as well as various combinations thereof).

in the feedback information as being EXCELLENT. In the flow priority reference information in Table 1, other priority levels are assigned based on other combinations of cell congestion levels and channel condition levels. It will be appreciated that, although primarily presented herein with respect to use of specific priority level values for specific combinations of specific cell congestion levels and channel condition levels, various other priority level values may be used, various other combinations of cell congestion levels and channel condition levels may be used, various other cell congestion levels may be used, various other channel condition levels may be used, or the like, as well as various combinations thereof.

The AS 220, when the feedback information includes cell-level congestion information and flow-level information including channel condition information and target rate information, may be configured to determine the priority of an adaptive bitrate streaming flow based on a combination of the cell-level congestion information of the cell with which the adaptive bitrate streaming flow is associated, the channel condition information of the wireless bearer supporting the adaptive bitrate streaming flow, and the target rate information of the adaptive bitrate streaming flow. In at least some embodiments, for example, the AS 220 may have access to flow priority reference information configured to define priority levels for combinations of cell congestion levels, channel condition levels, and target rate levels. An example in which flow priority reference information is based on cell congestion levels, channel condition levels, and target rate levels may be a modified version of Table 1, omitted for purposes of clarity, in which Table 1 is converted into a three-dimensional table including an additional dimension for the target rate levels. Here, assuming use of five target rate levels, the priority reference information would include one hundred and fifty priority levels (e.g., thirty priority levels similar to those of Table 1 for each of the five target rate levels, thereby giving one hundred and fifty priority levels of priority reference information). In the flow priority reference information in such a modified version of Table 1, the lowest priority (which may be denoted as P1) may be assigned to an adaptive bitrate streaming flow for which the congestion level of the associated cell is reported in the

TABLE 1

| | | CELL CONGESTION LEVELS | | | | | |
| --- | --- | --- | --- | --- | --- | --- | --- |
| | | NONE | VERY LOW | LOW | MEDIUM | HIGH | VERY HIGH |
| CHANNEL CONDITION LEVELS | VERY POOR | P1 | P2 | P3 | P4 | P5 | P6 |
| | POOR | P7 | P8 | P9 | P10 | P11 | P12 |
| | FAIR | P13 | P14 | P15 | P16 | P17 | P18 |
| | GOOD | P19 | P20 | P21 | P22 | P23 | P24 |
| | EXCELLENT | P25 | P26 | P27 | P28 | P29 | P30 |

In the flow priority reference information in Table 1, the lowest priority (denoted as P1) is assigned to an adaptive bitrate streaming flow for which the congestion level of the associated cell is reported in the feedback information as being NONE and the channel condition of the adaptive bitrate streaming flow is reported in the feedback information as being VERY POOR. In the flow priority reference information in Table 1, the highest priority (denoted as P30) is assigned to an adaptive bitrate streaming flow for which the congestion level of the associated cell is reported in the feedback information as being VERY HIGH and the channel condition of that adaptive bitrate streaming flow is reported feedback information as being NONE, the channel condition of the adaptive bitrate streaming flow is reported in the feedback information as being VERY POOR, and the target rate of the adaptive bitrate streaming flow is reported in the feedback information as being VERY LOW. In the flow priority reference information in such a modified version of Table 1, the highest priority (which may be denoted as P150) may be assigned to an adaptive bitrate streaming flow for which the congestion level of the associated cell is reported in the feedback information as being VERY HIGH, the channel condition of that adaptive bitrate streaming flow is reported in the feedback information as being EXCEL- LENT, and the target rate of the adaptive bitrate streaming flow is reported in the feedback information as being VERY HIGH. In the flow priority reference information in such a modified version of Table 1, other priority levels may be assigned based on other combinations of cell congestion levels, channel condition levels, and target rate levels. It will be appreciated that, although primarily presented herein with respect to use of specific priority level values for specific combinations of specific cell congestion levels, channel condition levels, and target rate levels, various other priority level values may be used, various other combinations of cell congestion levels, channel condition levels, and target rate levels may be used, various other cell congestion levels may be used, various other channel condition levels may be used, various other target rate levels may be used, or the like, as well as various combinations thereof. The AS 220, as discussed above, is configured to determine and set the priority levels of the adaptive bitrate streaming flows relative to the other types of flows such that the adaptive bitrate streaming flows receive improved or even optimized QoE. The AS 220 receives various flows intended for delivery via the eNB 250, determines and sets the priority levels of the flows, schedules the flows based on the priority levels assigned to the flows, and sends the flows to the eNB 250 based on the scheduling of the flows.

The AS 220, as discussed above, includes a data plane element 230 and a control plane element 240, where the data plane element 230 is configured to support transport of application flows via the AS 220 and the control plane element 240 is configured to support control over the data plane element 230 that supports transport of application flows via the AS 220 and, thus, to support control over transport of application flows within the wireless communication network 200. It will be appreciated that the application flows may include (adaptive bitrate streaming flows and other types of flows other than adaptive bitrate streaming flows. The ACE 231 of the data plane element 230 is configured to receive flows from the s1 tunnel termination 211 of SGW 210, classify the flows, and provide the flows to the BE 232 of the data plane element 230. The BE 232 of the data plane element 230 is configured to buffer the flows prior to transmission of the flows from the AS 220 toward the eNB 250. The SME 233 of the data plane element 230 is configured to schedule the flows for transmission from the AS 220 toward the eNB 250. The scheduling of the flows for transmission from the AS 220 toward the eNB 250 may include marking of the flows based on priority levels determined for and assigned to the flows by the control plane element 240. As discussed above, the control plane element 240 of the AS 220, for adaptive bitrate streaming flows, may receive the feedback information from the eNB 250 and determine scheduling of the adaptive bitrate streaming flows based on the feedback information from the eNB 250. The scheduling of the adaptive bitrate streaming flows by the control plane element 240 may be based on priority levels assigned to the adaptive bitrate streaming flows by the control plane element 240 based on the feedback information from the eNB 250. The data plane element 230 sends the flows, including the adaptive bitrate streaming flows toward the eNB 250 based on the flow priority levels assigned to the flows by the control plane element 240. It will be appreciated that the feedback information received by the AS 220 from the eNB 250 may represent a control loop configured to control sending of adaptive bitrate streaming flows from the AS 220 toward the eNB 250 such that, for a given adaptive bitrate streaming flow, the priority level of the adaptive bitrate streaming flow may be evaluated and, thus, may change, over time as feedback information associated with the adaptive bitrate streaming flow is received (and, thus, the priority levels of and, therefore, scheduling of, different portions of the adaptive bitrate streaming flow (e.g., packets or the like, which may vary depending on the definition of the adaptive bitrate streaming flow) may vary over time). In this manner, the data plane element 230 and control plane element 240 of the AS 220 cooperate to support improved delivery of flows from the AS 220 to the eNB 250 (including improved QoE for the adaptive bitrate streaming flows).

It will be appreciated that, although primarily presented herein with respect to embodiments provided within the context of a specific implementation of wireless communication network 200 (e.g., where wireless communication network 200 is a 4G LTE based wireless communication network), embodiments may be provided within the context of various other types of wireless communication networks (e.g., such as one or more of those discussed with respect to the wireless communication network 130 of FIG. 1).

Figure 3:
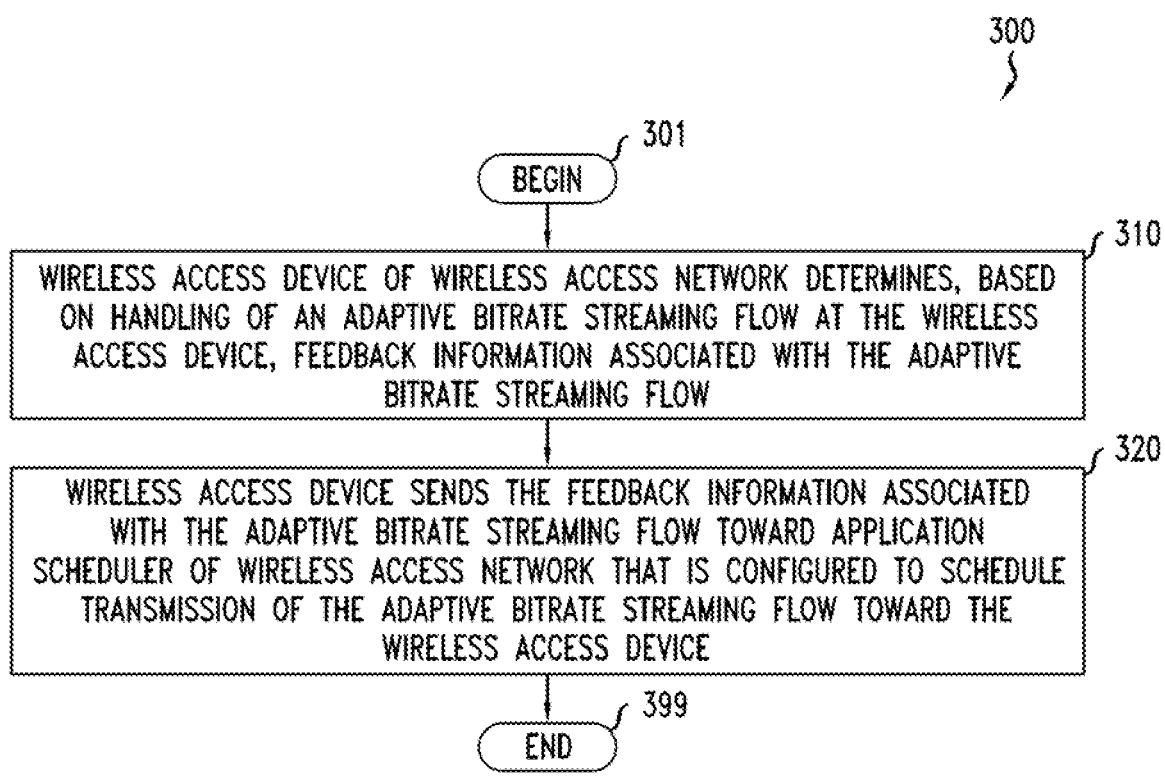
FIG. 3 depicts an embodiment of a method for use by a wireless access device of a wireless access network to provide feedback information for adaptive bitrate streaming flows to an application scheduler of the wireless access network.

FIG. 3 depicts an embodiment of a method for use by a wireless access device of a wireless access network to provide feedback information for adaptive bitrate streaming flows to an application scheduler of the wireless access network. It will be appreciated that, although functions of method 300 are primarily presented herein as being performed serially, at least a portion of the functions of method 300 may be performed contemporaneously or in a different order than as presented in FIG. 3. At block 301, method 300 begins. At block 310, the wireless access device determines, based on handling of an adaptive bitrate streaming flow by the wireless access device, feedback information associated with the adaptive bitrate streaming flow. At block 320, the wireless access device sends the feedback information associated with the adaptive bitrate streaming flow toward the application scheduler that is configured to schedule transmission of the adaptive bitrate streaming flow to the wireless access device. At block 399, method 300 ends.

Figure 4:
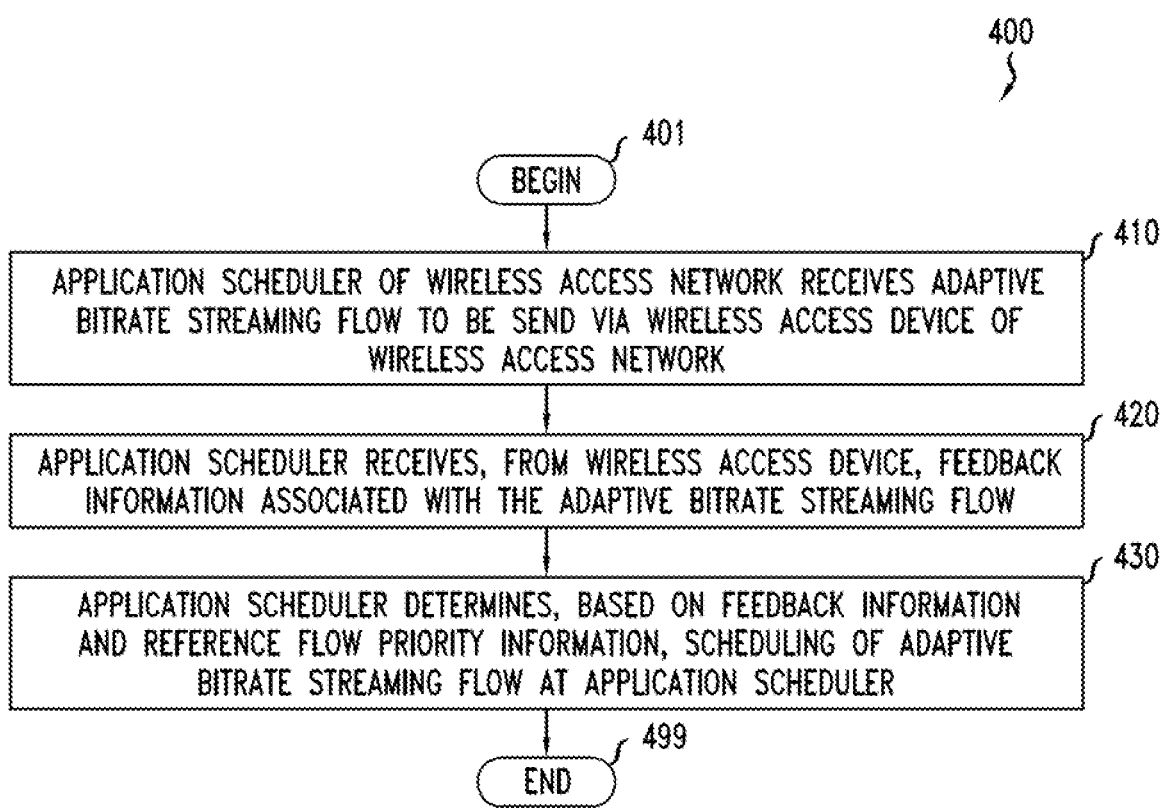
FIG. 4 depicts an embodiment of a method for use by an application scheduler of a wireless access network to schedule adaptive bitrate streaming flows based on feedback information from a wireless access device of the wireless access network.

FIG. 4 depicts an embodiment of a method for use by an application scheduler of a wireless access network to schedule adaptive bitrate streaming flows based on feedback information from a wireless access device of the wireless access network. It will be appreciated that, although functions of method 400 are primarily presented herein as being performed serially, at least a portion of the functions of method 400 may be performed contemporaneously or in a different order than as presented in FIG. 4. At block 401, method 400 begins. At block 410, the application scheduler receives the adaptive bitrate streaming flow to be sent via the wireless access device of the wireless access network. At block 420, the application scheduler receives, from the wireless access device, feedback information associated with the adaptive bitrate streaming flow. At block 430, the application scheduler determines, based on the feedback information and reference flow priority information, scheduling of the adaptive bitrate streaming flow at the application scheduler. At block 499, method 400 ends.

It will be appreciated that, although primarily presented at the flow level of the adaptive bitrate streaming flow, handling of the adaptive bitrate streaming flow may be performed for various portions of the adaptive bitrate streaming flow (e.g., packets, groups of packets, or the like). The feedback information received by the application scheduler from the wireless access device may represent a control loop configured to control sending of portions of an adaptive bitrate streaming flow from the application scheduler toward the wireless access device for transmission by the wireless access device over a wireless bearer of a cell of the wireless access device. For example, the application scheduler may receive a first portion (e.g., packet, group of packets, or the like) of the adaptive bitrate streaming flow, send the first portion of the adaptive bitrate streaming flow toward the wireless access device, receive feedback information associated with the adaptive bitrate streaming flow (e.g., determined based on handling of the first portion of the adaptive bitrate streaming flow at the wireless access device or based on handling of some other portion of the adaptive bitrate streaming flow at the wireless access device), determine scheduling of a second portion (e.g., packet, group of packets, or the like) of the adaptive bitrate streaming flow at the application scheduler based on the feedback information, and send the second portion of the adaptive bitrate streaming flow toward the wireless access device based on the scheduling of the second portion of the adaptive bitrate streaming flow at the application scheduler. In this manner, the feedback channel from the wireless access device to the application scheduler can be used to improve scheduling of the adaptive bitrate streaming flow at the application scheduler of the wireless access network.

It will be appreciated that, although primarily presented herein with respect to embodiments in which the local analytics element of the wireless access device operates based on local information available at the wireless access device, in at least some embodiments the local analytics element of the wireless access device may operate based on central information received from a central analytics element. The central analytics element may be configured to receive local information (e.g., raw reporting information, feedback information determined by the local analytics element, or the like, as well as various combinations thereof) from the local analytics elements of multiple wireless access devices, determine central information based on the local information from the local analytics elements of at least a portion of the multiple wireless access devices (e.g., central information that is common to two or more of the multiple wireless access devices, central information per wireless access device that is specific to the respective wireless access device(s), or the like, as well as various combinations thereof), and provide the central information to one or more of the multiple wireless access devices for use in supporting adaptive bitrate streaming. The central analytics element may be configured to perform continuous machine learning to maintain/adjust/rebuild cluster profiles (e.g., for each application type, for each bearer throughput profile, or the like, as well as various combinations thereof). The central analytics element may be configured to push such cluster profiles to adaptive bitrate stream identifiers under various conditions (e.g., periodically, in response to activation of a new application identification local analytics element, or the like, as well as various combinations thereof). The central analytics element may be configured to perform various functions presented herein as being performed by local analytics elements of wireless access devices for determining various types of feedback which may be used to support adaptive bitrate streaming. The wireless access device may be configured to use the central information from the central analytics element, alone or in combination with the local information from the local analytics element of the wireless access device, to supporting adaptive bitrate streaming (e.g., determining and providing feedback information to the application scheduler, determining and providing target rate feedback information to a scheduler target rate enforcement element of the wireless access device, or the like, as well as various combinations thereof).

It will be appreciated that various embodiments of the adaptive bitrate streaming support capability may provide various advantages or potential advantages. For example, various embodiment of the adaptive bitrate streaming support capability may be configured to consistently maintain high adaptive bitrate streaming video flow QoE on a wireless link in the presence of congestion on the wireless link (e.g., other best effort background traffic (e.g., User Datagram Protocol (UDP) traffic, File Transfer Protocol (FTP) traffic, or the like) on the wireless link), in the presence of varying channel conditions on the wireless link, or the like, as well as various combinations thereof. For example, various embodiment of the adaptive bitrate streaming support capability may be configured to maintain the target rates of adaptive bitrate streaming flows at a consistently high bitrate (which may be desirable or necessary under various conditions, such as to support high definition video, when the screen size of the device is relatively large, or the like). It will be appreciated that various embodiments of the adaptive bitrate streaming support capability may provide various other advantages or potential advantages.

Figure 5:
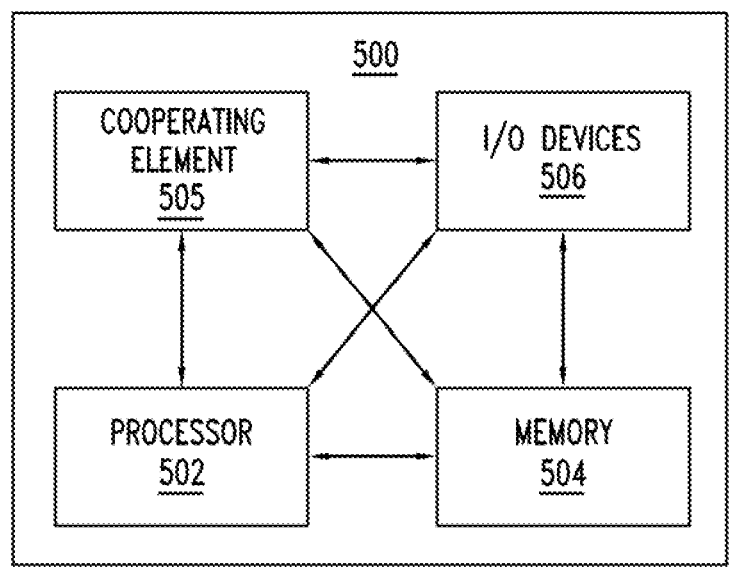
FIG. 5 depicts a high-level block diagram of a computer suitable for use in performing various functions presented herein.

FIG. 5 depicts a high-level block diagram of a computer suitable for use in performing various functions described herein.

The computer 500 includes a processor 502 (e.g., a central processing unit (CPU), a processor having a set of processor cores, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing one or more of adaptive bitrate streaming server 110, an adaptive bitrate streaming client device 120, an element of the wireless communication network 130, an element of the wireless core network 131, an element of the wireless access network 132, the AS 133, the WAD 134, the SGW 210, the AS 220 or a portion thereof, the data plane element 230 of the AS 220 or a portion thereof, the control plane element 240 of the AS 220, the eNB 250 or a portion thereof, the data plane element 260 or a portion thereof, the PDCP element 262, the RLC element 263, the scheduler 264, the MAC element 265, one or more of the AAs 270, the LAE 280 or a portion thereof, the CCEE 281, the ABSFIE 282, the TRCE 283, the FDE 284, the CE 285, the TRSE 290, or the like, as well as various combinations thereof.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
   receive, by an application scheduler of a wireless access network, an adaptive bitrate streaming flow to be sent via a wireless access device of the wireless access network;
   receive, by the application scheduler from the wireless access device, feedback information associated with the adaptive bitrate streaming flow, wherein the feedback information includes cell congestion information and channel condition information;
   maintain, by the application scheduler, reference flow priority information including a plurality of flow priority levels associated with a respective plurality of combinations of a plurality of cell congestion levels and a plurality of channel condition levels; and
   determine, by the application scheduler based on identification of one of the plurality of flow priority levels from the reference flow priority information based on the feedback information, scheduling of the adaptive bitrate streaming flow at the application scheduler.

2. The apparatus of claim 1, wherein the cell congestion information is associated with a cell of the wireless access device supporting a wireless bearer supporting the adaptive bitrate streaming flow and the channel condition information is associated with the wireless bearer supporting the adaptive bitrate streaming flow.

3. The apparatus of claim 1, wherein the processor is configured to receive the cell congestion information and the channel condition information over different timescales.

4. The apparatus of claim 3, wherein the processor is configured to receive the cell congestion information less frequently than the channel condition information.

5. The apparatus of claim 1, wherein the feedback information associated with the adaptive bitrate streaming flow further comprises target rate information associated with the adaptive bitrate streaming flow.

6. The apparatus of claim 5, wherein the reference flow priority information includes a plurality of flow priority levels associated with a respective plurality of combinations of the plurality of cell congestion levels, the plurality of channel condition levels, and a plurality of target rate levels.

7. The apparatus of claim 5, wherein the processor is configured to receive the cell congestion information and the channel condition information and the target rate information over different timescales.

8. The apparatus of claim 7, wherein the processor is configured to receive the cell congestion information less frequently than the channel condition information and the target rate information.

9. The apparatus of claim 1, wherein, to determine scheduling of the adaptive bitrate streaming flow, the processor is configured to:
   determine scheduling of the adaptive bitrate streaming flow, relative to at least one other flow, based on the one of the plurality of flow priority levels of the adaptive bitrate streaming flow.

10. The apparatus of claim 9, wherein the at least one other flow comprises a non adaptive bitrate streaming flow.

11. The apparatus of claim 1, wherein the processor is configured to:
    send, by the application scheduler toward the wireless access device based on the scheduling of the adaptive bitrate streaming flow at the application scheduler, the adaptive bitrate streaming flow.

12. A method, comprising:
    receiving, by an application scheduler of a wireless access network, an adaptive bitrate streaming flow to be sent via a wireless access device of the wireless access network;
    receiving, by the application scheduler from the wireless access device, feedback information associated with the adaptive bitrate streaming flow, wherein the feedback information includes cell congestion information and channel condition information;
    maintaining, by the application scheduler, reference flow priority information including a plurality of flow priority levels associated with a respective plurality of combinations of a plurality of cell congestion levels and a plurality of channel condition levels; and
    determining, by the application scheduler based on identification of one of the plurality of flow priority levels from the reference flow priority information based on the feedback information, scheduling of the adaptive bitrate streaming flow at the application scheduler.

13. An apparatus, comprising:
    a processor and a memory communicatively connected to the processor, the processor configured to:
    determine, at a wireless access device of a wireless access network based on handling of an adaptive bitrate streaming flow at the wireless access device, feedback information including cell congestion information for a cell of the wireless access device, channel condition information associated with the adaptive bitrate streaming flow, and target rate information associated with the adaptive bitrate streaming flow; and send the feedback information from the wireless access device toward an application scheduler of the wireless access network that is configured to schedule transmission of the adaptive bitrate streaming flow toward the wireless access device based on the feedback information, wherein the cell congestion information is sent with a cell identifier of the cell over a first time scale, wherein the channel condition information and the target rate information are sent with a flow identifier of the adaptive bitrate streaming flow over a second time scale that is shorter than the first time scale.

14. The apparatus of claim 13, wherein the cell of the wireless access device supports a wireless bearer supporting the adaptive bitrate streaming flow and the channel condition information is associated with the wireless bearer supporting the adaptive bitrate streaming flow.

15. The apparatus of claim 13, wherein the processor is configured to:

send the target rate information toward a flow scheduler of the wireless access device.

16. The apparatus of claim 13, wherein the target rate information comprises a target rate for the adaptive bitrate streaming flow.

17. The apparatus of claim 13, wherein the target rate information comprises a target rate for a bearer supporting the adaptive bitrate streaming flow.

18. The apparatus of claim 17, wherein the target rate for the bearer supporting the adaptive bitrate streaming flow comprises a desired throughput rate for the bearer in the wireless access network.

19. The apparatus of claim 13, wherein the target rate information comprises a target rate for a set of bearers of a bearer type, wherein bearer type is associated with an application flow type of the adaptive bitrate streaming flow.

20. A method, comprising:

determining, at a wireless access device of a wireless access network based on handling of an adaptive bitrate streaming flow at the wireless access device, feedback information including cell congestion information for a cell of the wireless access device, channel condition information for the adaptive bitrate streaming flow, and target rate information for the adaptive bitrate streaming flow; and sending the feedback information from the wireless access device toward an application scheduler of the wireless access network that is configured to schedule transmission of the adaptive bitrate streaming flow toward the wireless access device based on the feedback information, wherein the cell congestion information is sent with a cell identifier of the cell over a first time scale, wherein the channel condition information and the target rate information are sent with a flow identifier of the adaptive bitrate streaming flow over a second time scale that is shorter than the first time scale.

* * * * *